(12) United States Patent
Kirkpatrick

(10) Patent No.: US 6,792,094 B1
(45) Date of Patent: Sep. 14, 2004

(54) INTELLIGENT CALL CONNECTION SERVICE

(75) Inventor: Mark Kirkpatrick, Conyers, GA (US)

(73) Assignee: BellSouth Intellectual Property Corporation ( * ) Notice: Subject to any disclaimer, the term of this patent is extended or adjusted under 35 U.S.C. 154(b) by 519 days.

(21) Appl. No.: 09/863,477

(22) Filed: May 23, 2001

(51) Int. Cl.[7] .............................................. H04M 3/42
(52) U.S. Cl. .............................. 379/209.01; 379/88.18; 379/210.01; 379/904
(58) Field of Search ......................... 379/88.16, 88.18, 379/88.21, 209.01, 210.01, 211.03, 216.01, 355.01, 355.02, 904

(56) References Cited

U.S. PATENT DOCUMENTS

| | | | | |
|---|---|---|---|---|
| 3,854,014 A | * | 12/1974 | Akin et al. | 379/209.01 |
| 4,166,929 A | * | 9/1979 | Sheinbein | 379/209.01 |
| 5,268,957 A | * | 12/1993 | Albrecht | 379/209.01 |
| 5,521,965 A | * | 5/1996 | D'Alessio et al. | 379/209.01 |
| 5,533,100 A | * | 7/1996 | Bass et al. | 379/88.06 |
| 5,627,875 A | * | 5/1997 | Kapsales | 455/567 |
| 5,784,438 A | * | 7/1998 | Martinez | 379/67.1 |
| 6,009,157 A | * | 12/1999 | Bales et al. | 379/209.01 |
| 6,035,031 A | * | 3/2000 | Silverman | 379/209.01 |
| 6,546,096 B1 | * | 4/2003 | Meiden et al. | 379/209.01 |

OTHER PUBLICATIONS

"A Response to OFTEL's Review of Personal Numbering Services—Mar. 1998," printed from http://www.telescapes.com.au/resource/oftelpnrev1.htm on Mar. 12, 2001.
"Personal Number Service," printed from http://www.as-com.ch/mesa/ouroffpe.htm on Mar. 12, 2001.

* cited by examiner

Primary Examiner—Bing Q. Bui
(74) Attorney, Agent, or Firm—Kirkpatrick & Lockhart LLP

(57) ABSTRACT

At telecommunication service that takes caller mobility into account and allows the caller to connect to a destination on one attempt. The intelligent call connection service according to the present invention receives a call initiated by a caller/subscriber and dials the called party's number identified by the subscriber. If the called party's line is busy or unanswered, the connection service prompts the subscriber to hang up. Thereafter, the connection service continues calling the called party for a predetermined duration and, when the called party answers, calls the subscriber back at one or more of the telephone numbers supplied by the subscriber as part of the service subscription. Thus, the subscriber or caller mobility is not hampered when the called party's line is busy or unanswered. The service-doesn't require the caller/subscriber to reinitiate the call when the called party's line is busy or unanswered. The call connection service takes a subscriber's call and connects to a destination requiring only one calling attempt by the caller/subscriber.

20 Claims, 4 Drawing Sheets

INTELLIGENT CALL CONNECTION SERVICE

BACKGROUND OF THE INVENTION

1. Field of the Invention

The present invention broadly relates to telecommunication services, and, more particularly, to a telephone service that connects a calling party to a called party without requiring the calling party to enter the called party's telephone number more than once.

2. Description of the Related Art

In an attempt to accommodate or catch up with increased human mobility in today's world, the modern telecommunications industry has offered, and continues to offer, a number of advanced telephone systems and service plans. For example, some of the advanced Private Branch Exchanges (or, PBX's) or public telephone switches (in telephone central offices) offer call broadcasting or automatic call redialing features so as to assist the calling party in reaching the desired called party in a timely manner. In call broadcasting, the incoming call from the calling party is broadcast to pre-designated destination telephones (e.g., a select group of telephones in an organization) in an attempt to reach the called party, or, at least to find a party who can receive and answer the incoming call. In a call redialing service, the PBX or the central office switch may sense a busy line condition on the called party's telephone line and prompt the calling party to select the redialing option. The calling party then hangs up, but the switch or PBX continues redialing the called party's telephone number for a predetermined duration. The calling party is then connected to the called party when the called party answers during one of the redialing efforts. A telephone service provider may charge the subscriber for such services.

Another useful telephone service that provides mobility to its users is the Personal Number Service (PNS) offered by many telephone service providers. The PNS is very useful to people who lead organized lives and who often travel globally. The PNS gives users the opportunity to be in control of their reachability. The PNS gives the service user the possibility to receive calls at any desired location and gives the user personal mobility and access to telecommunication services. In PNS, the subscriber is assigned a single personal telephone number that remains unchanged even if the subscriber moves from one geographic location to another. The caller does not need to know where the called party (i.e., the PNS subscriber) is to get through. The subscriber, on the other hand, can easily modify the subscriber's contact information or profile by making a phone call to the PNS service provider's customer service center or via the world wide web. Thus, the PNS enables a customer to access all of the customer's telecommunication services, and to make and receive calls, on any terminal. Calls can be routed to the nearest telephone, mobile phone, or message box specified by the PNS subscriber. The PNS service does not depend on a specific telephone receiver terminal or on a specific access network (e.g., wireline or wireless). The PNS lets its subscribers control their contactability by allowing them to specify how, when, where, and by whom they can be contacted.

However, each of the abovementioned features—i.e., call broadcasting, call redialing, and personal number service—has its own limitation. For example, in call broadcasting, the called party may not be available at any of the telephone terminals that the telephone call is broadcast to. In that case, the calling party may have to place another phone call or leave a voice message (if that option is available) for the called party. In call redialing, when the service finally detects that the called party's line is no more busy and tries to connect the called party to the caller, the caller may have moved from the caller's original telephone terminal and, hence, the service may not be able to connect the caller to the called party. Thus, even if the called party's line is now free, the caller is not contactable. The called party may then leave a voice message for the caller, and the caller thus ends up placing another phone call later to the called party if the caller wishes to speak with the called party in person. The problem of caller mobility is not addressed by the PNS either. Instead, the PNS focuses more on callee (i.e., the called party) mobility. The PNS attempts to reach the called party through a number of preselected call receive options. But, even here, it may be possible that the caller may not get a chance to personally speak with the called party. Therefore, the caller may still have to reinitiate the phone call if a conversation with the callee is desired.

It is therefore desirable to devise a telecommunication service that takes caller mobility into account and allows the caller to connect to a destination on one attempt. In other words, it is desirable to provide an intelligent call connection service that doesn't require the caller to reinitiate the call when the called party's line is busy or unanswered. It is further desirable that the service subscriber be able to access the intelligent call connection service as soon as the subscriber picks up a phone to initiate a call, i.e., without the subscriber dialing any access number to reach the service. It is also desirable that subscribers be able to access the intelligent call connection service from rotary phones.

SUMMARY OF THE INVENTION

In one embodiment, the present invention contemplates an intelligent call connection service that establishes a telephone connection between a caller and a callee (i.e., the called party). The service includes receiving a first telephone call from the caller, wherein the first telephone call identifies a telephone number for the callee; placing a second telephone call to the callee at the telephone number; identifying whether one of the following conditions is present at a telephone associated with the callee's telephone number: the telephone remains on-hook after receiving the second telephone call, and the telephone has been off-hook prior to receiving the second telephone call; prompting the caller to indicate whether the caller wishes to continue calling the callee's telephone number despite the one of the conditions; allowing the caller to hang up after indicating the caller's desire to continue calling the callee's telephone number; placing one or more phone calls to the callee's telephone number until a predetermined time period runs out, wherein two consecutive phone calls from the one or more phone calls are spaced a predetermined interval apart; requesting the callee to remain on line after the callee answers one of the one or more phone calls; and placing a third telephone call to the caller using a reach list to establish the telephone connection between the caller and the callee, wherein the reach list includes a plurality of caller-specific telephone numbers that provides options for contacting the caller at more than one telephone number.

The call connection service obviates the need for the service subscriber to repetitively monitor the availability of callee's telephone line or to remain present at one telephone location until the callee gets connected. The call connection service allows caller mobility when the callee does not answer the caller's phone call on the first attempt or when the callee's telephone line is busy when the caller first dials the callee's number. After the subscriber dials the callee's number, the connection service takes over and the subscriber need not wait on line for the callee to answer. If the called party's line is busy or unanswered, the connection service prompts the subscriber to hang up. Thereafter, the connection service continues calling the called party for a predetermined duration and, when the called party answers, calls the subscriber back at one or more of the telephone numbers supplied by the subscriber as part of the service subscription. The service doesn't require the caller/subscriber to reinitiate the call when the called party's line is busy or unanswered. The call connection service takes a subscriber's call and connects to a destination requiring only one calling attempt by the caller/subscriber.

In an alternative embodiment, the present invention further contemplates a telecommunication system that is configured to provide the intelligent call connection service in the manner given hereinabove. The telecommunication system may implement the call connection service by executing corresponding software for the service. The telecommunication system may be an AIN (Advanced Intelligent Network) platform. In one embodiment, a telecommunications service provider or the operator of the telecommunication system may charge the subscribers fees to utilize the call connection service. The connection service software may be equipped with a dialed pulse digit detection feature to allow subscribers with rotary phones to also use the service from their rotary phones.

BRIEF DESCRIPTION OF DRAWINGS

Further advantages of the present invention may be better understood by referring to the following description taken in conjunction with the accompanying drawings, in which.

DETAILED DESCRIPTION OF PREFERRED EMBODIMENTS

Figure 1:
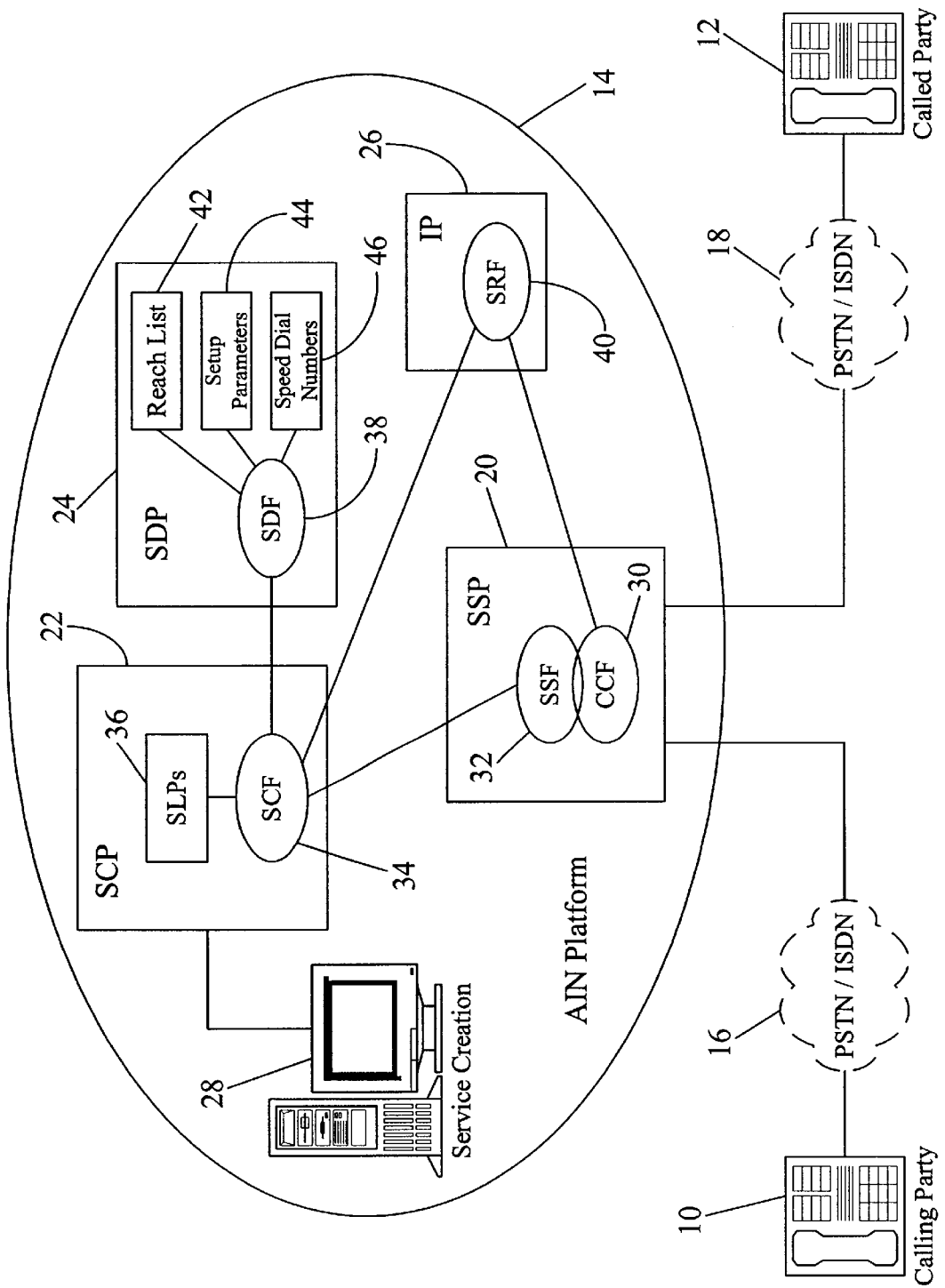
FIG. 1 shows an exemplary system configuration to implement the intelligent call connection service according to an embodiment of the present invention.

FIG. 1 shows an exemplary system configuration to implement the intelligent call connection service (the "connection service") according to an embodiment of the present invention. In the embodiment illustrated in FIG. 1, a calling party (the "caller") 10 is shown to be in communication arrangement with the called party (the "callee") 12 via an AIN (Advanced Intelligent Network) platform 14. The caller 10 is a subscriber of the intelligent call connection service described in more detail hereinbelow. However, the callee 12 may or may not be a subscriber of the connection service. It is noted that the caller and the callee are represented by corresponding telephone terminals in FIG. 1 for ease of depiction. In actuality, the caller and the callee are humans operating the telephones 10 and 12 respectively. Furthermore, the term "called party", as used herein, includes the actual person the caller wishes to be connected to or any other person at the called telephone number picking up or answering the caller's phone.

It is observed that the caller 10 or the callee 12 may not be directly connected to the AIN 14, but, instead, through a local PSTN (Public Switched Telephone Network) or ISDN (Integrated Services Digital Network) as illustrated by the dotted clouds 16 and 18 respectively. In one embodiment, only one PSTN/ISDN (e.g., PSTN/ISDN 16) may be qualified to handle calls for both the caller 10 and the callee 12. A telephone company (telco) central office switch may form part of the initial PSTN/ISDN platform that a call encounters first prior to being routed to the AIN platform 14. The AIN 14 may include a more advanced and sophisticated switching and call processing mechanism as discussed hereinbelow in more detail. Thus, in the discussion given herein, it is implicitly assumed that regular PSTNs may not be capable of performing AIN functionality. However, that may not hold true in every circumstance and, hence, in one embodiment, the PSTN/ISDN 16, 18 may include the AIN functionality represented by block 14 in FIG. 1 and discussed hereinbelow.

An Advanced Intelligent Network (AIN) is a vendor- and platform-independent telecommunications network that is designed with distributed network intelligence in databases called Service Control Points (SCPs) (e.g., the SCP 22 in FIG. 1). By separating call processing intelligence from the switch, advanced intelligent networks promise reduced service provider dependence on switch-generic features. New services can be created on distributed platforms across the network much faster and at substantial cost savings. Service creation may also be distributed in workstations called Service Creation Environments (SCEs) (e.g., the SCE 28 in FIG. 1). The SCP 22 and SCE 28 are described later hereinbelow.

In both wireline and wireless networks, the AIN architecture separates call processing intelligence and feature functionality from network switches, placing that intelligence and functionality in platforms spread across the network. The call processing intelligence is sometimes referred to as service logic. An AIN infrastructure typically involves service logic on network platforms, an out-of-band signaling system (e.g., the signaling system#7, or SS7), and AIN-capable software in the network switch. With this infrastructure in place, service providers, end users and third parties may be able to create and modify services independently of switch vendors. Some of the advantages of the AIN architecture (for wireline or wireless networks) include: reduced service provider dependence on switch generic availability for features and services; cost savings by having multiple applications reside on one platform and sharing resources; rapid creation and deployment of services; allows service providers to create differentiating services; facilitation of mobility management functions; reduced fraud; and in case of wireless intelligent networks (WIN), facilitation of interoperability with wireline networks.

The voice-associated functions may stay closely coupled to the AIN switch (e.g., the SSP 20), but SCPs may be used to deploy data-related services (such as Short Message Service, Unified Messaging, or Debit cards) and may be placed anywhere that a SS7 data connection can be maintained. The AIN provides advanced services which cannot be easily implemented in the switch or cannot be best offered from a central point in the network. To achieve this, the digital switch (in the telco central office) is enhanced so that it becomes an AIN service switching point (SSP) 20, thus enabling it to notify the service control point (SCP) 22 when processing of the call/connection requires an AIN interaction.

Additional AIN functional architecture is illustrated in FIG. 1. The AIN platform 14 may also include a Service Data Point (SDP) 24 and an Intelligent Peripheral (IP) 26. The existing software which controls the switch (i.e., the SSP 20) and communicates with a user terminal (here, the caller telephone unit 10 and the callee telephone unit 12) is the call control function (CCF) 30. The service switching function (SSF) 32 is added to provide the interface to enable call processing to interact with the AIN control platform represented by the SCP 22. The flexibility of the AIN arises from the SCP which comprises a service control function (SCF) 34 and a service data function (SDF) 38. The SCF runs services via service logic programs (SLPs) 36. The SDF 38 may run on the SDP 24 and provide service information such as translation tables and user profile data. Service-independent building blocks (SIBs) are used to construct AIN services in SLPs. The SLPs communicate with the underlying SSPs via INAP (intelligent network application part) operations.

The software for the intelligent call connection service of the present invention may be created on the SCE 28 and then loaded onto the SCP 22 as part of the SLPs 36 running on the SCP 22. Alternatively, upon creation, the software may first be stored on one or more data storage media (e.g., compact discs (CDs), floppy diskettes, magnetic tape cartridges, digital versatile disks (DVDs), etc.). Thereafter, the storage media may be transported to the SCP 22 to load the call connection service software thereon. A service (e.g., the call connection service of the present invention) is a software application on the AIN platform 14 that provides a defined set of functions that interact with the AIN platform 14 (and, hence, with the users of the AIN 14) and a set of service data. The software developer may define the functionality of the connection service along with the type and scope of data used by the service. The call connection service of the present invention primarily utilizes three main data blocks or tables: (1) The Reach List 42; (2) the Setup Parameters 44; and (3) the Speed Dial Numbers 46. These three data tables may be stored (or maintained) in the SDP 24 as shown in FIG. 1.

The Reach List 42 includes various telephone numbers (e.g., home number, mobile phone number, voice mail number, office phone number, etc.) selected by the subscriber of the call connection service. These subscriber-specific telephone numbers are later used by the connection service to contact the subscriber as described later hereinbelow. The subscriber may specify the order of connection—i.e., the order in which the telephone numbers in the Reach List 42 should be dialed by the connection service to reach the subscriber in the event that the subscriber cannot be reached at a specific number. The Setup Parameters 44 includes customer- or subscriber-specific service parameters including, for example, Retry_Count (i.e., the number of times the callee's number has been retried by the connection service), Frequency (i.e., the interval between two successive retries), Number_of_ Retries (i.e., the number of times the callee's number should be retried by the connection service), etc. In the preferred embodiment, the subscriber can specify the values for these setup parameters. However, in an alternative embodiment, the service provider may assign fixed values for the setup parameters and the subscriber may not alter them. The Speed Dial Numbers table 46 stores speed dial numbers for the subscriber. In one embodiment, the service may store ten speed dial numbers for the subscriber to correspond to speed dial digits "0" through "9". In an alternative embodiment, the service may store one hundred speed dial numbers for numbers "0" through "99". The subscriber simply dials the desired speed dial digit or number to place a call to the party whose telephone number is associated with the dialed digit or number. The connection service looks up the Speed Dial Numbers table 46 to obtain the actual telephone number of the called party from the speed dial digit or number collected from the caller subscriber. The service may allow the subscriber to change the subscriber-specific speed dial numbers at any time over the phone or via the Internet as discussed later hereinbelow.

The software for the intelligent call connection service may be switch-independent. However, in one embodiment, the software that implements the functionality of the call connection service is created for a Nortel switching platform. The software for the connection service is executed in a UNIX environment and is written in $C^{++}$ and Java programming languages.

The specialized resource function (SRF) 40 (in the IP 26) can be temporarily connected to the caller/subscriber 10 to play announcements and collect digits from the caller. An IVR (Interactive Voice Response) system may be implemented in the IP 26 through the SRF 40 so that a calling party can interact with the call connection service and can input data or call processing selections via a telephone handset in response to voice prompts received from the IVR system. The entire process may be generally explained as follows. When the caller dials a special number to access the call connection service, the special number is first received by the SSP 20. The SSF 32 in the SSP 20 recognizes the special access number as different from regular telephone numbers and forwards the access number to the SCP 22 for further processing. The SCP 22 (via the SCF 34) identifies the service requested (i.e., the call connection service) from part of the access number dialed by the caller 10 and returns information about how to handle the call to the SSP 20. Initially, when a customized voice announcement is to be played to greet the subscriber and to offer the call connection service options to the subscriber, the SCF 34 may instruct the SRF 40 in the IP 26 to relay the customized voice announcement (using the IVR system) to the customer 10 via the CCF 30 acting as an interface between the IP 26 and the caller telephone unit 10. Any digits (e.g., a speed dial digit or a telephone number) entered by the caller 10 when prompted by the call connection service after the initial greeting are collected by the SRF 40 (through the CCF 30) and sent to the SCF 34 for further processing by the SCP 22. The SCP 22 may then access an appropriate data table (e.g., the Speed Dial Numbers table 46), if needed, and send the callee's telephone number to SSF 32 for placing the call.

Figure 2A:
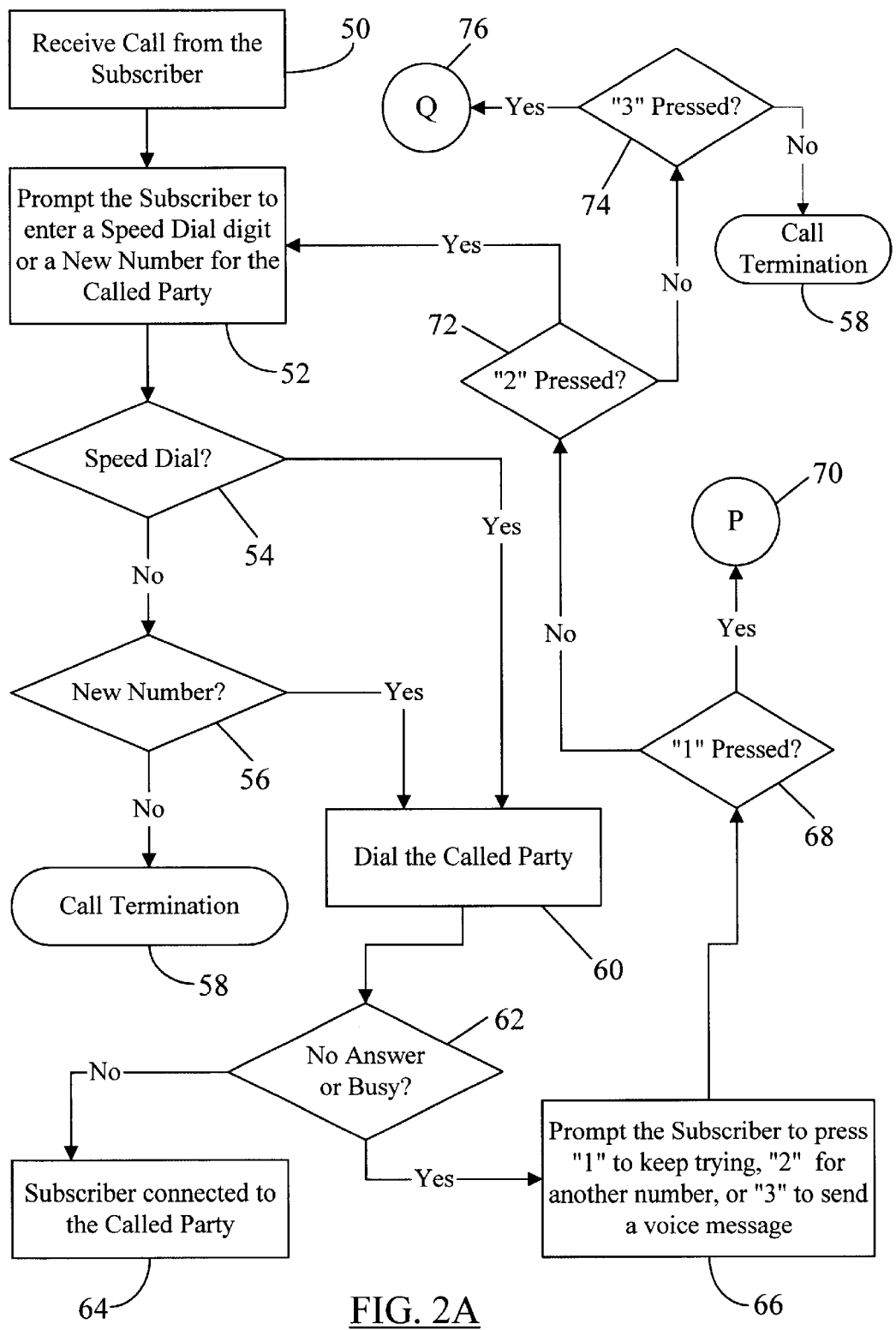
FIGS. 2A–2C illustrate flowcharts for the intelligent call connection service according to an embodiment of the present invention.
Figure 2B:
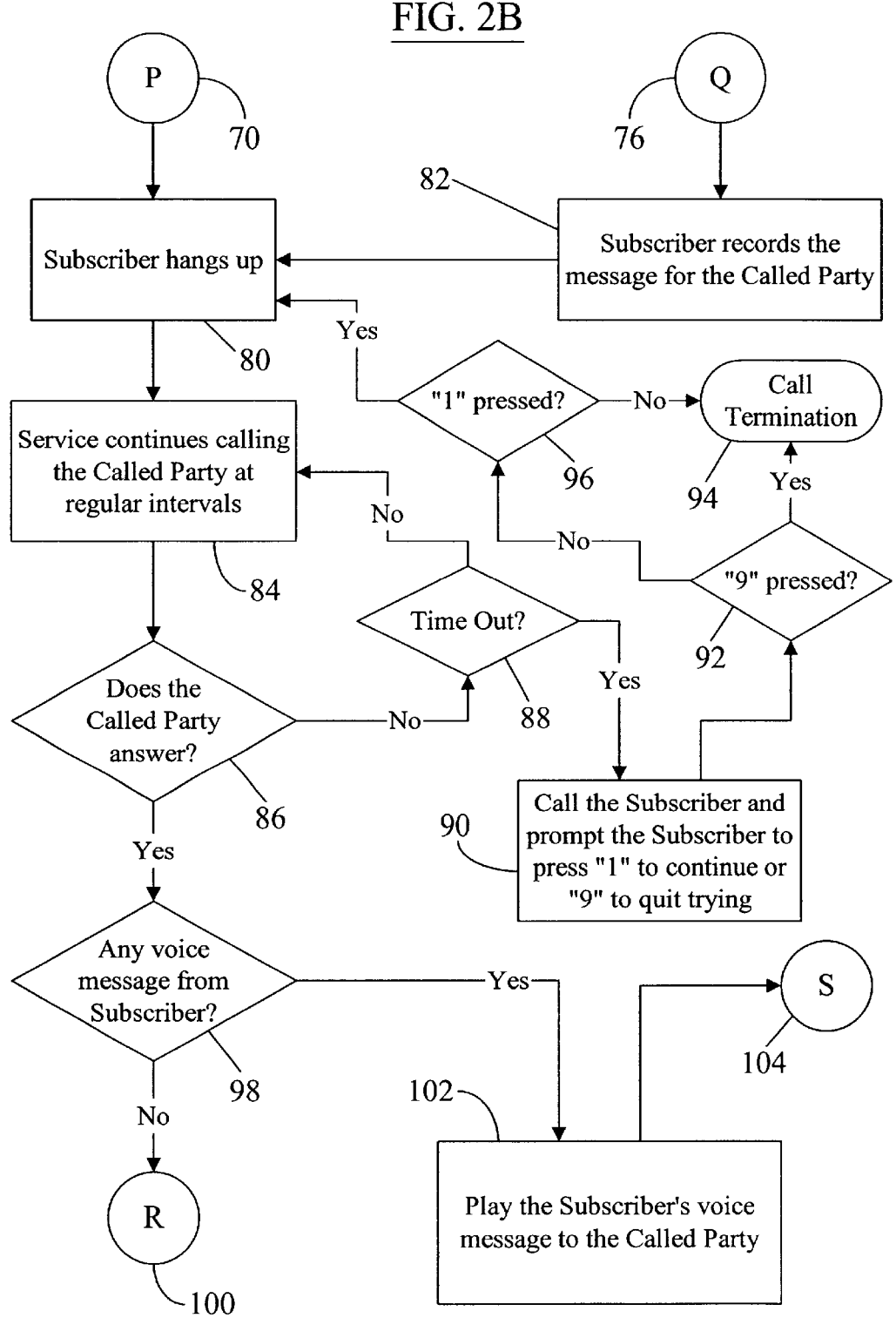
Figure 2C:
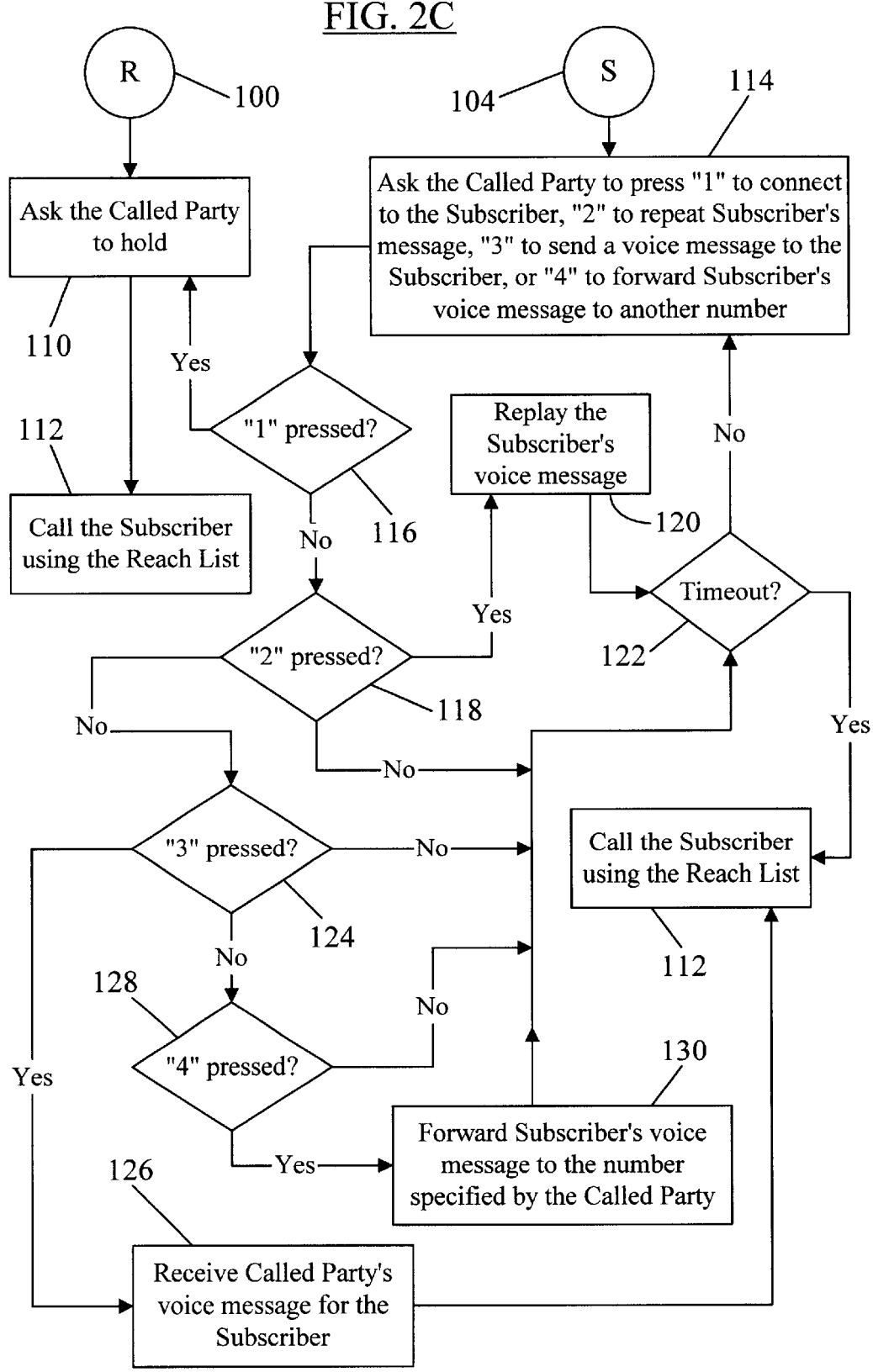

FIGS. 2A–2C illustrate flowcharts for the intelligent call connection service according to an embodiment of the present invention. For the sake of simplicity, the discussion hereinbelow refers to the call connection service software as performing various operations described—i.e., without repetitively identifying individual AIN network entities responsible to implement each feature/operation of the call connection service. However, it is understood that the connection service software does not function in a vacuum; rather, various call processing functions are carried out by the software (in the SLP 36) in conjunction with and with the help from several network entities (e.g., the SCP 22, the IP 26, etc.) in the AIN platform 14 as discussed hereinbefore.

Referring now to FIG. 2A, at block 50, the call connection service first receives a call from the caller/subscriber 10. In one embodiment, the subscriber may need to dial a specific access number (assigned by the commercial provider of the call connection service) to identify to the SCP 22 that the subscriber wishes to invoke the call connection service. Upon receiving an indication from the subscriber that the subscriber wishes to use the call connection service, the service (with the help of the IP 26, for example) voice prompts the subscriber to enter either a speed dial digit/ number (e.g., the digit "8" or the number "43") or a complete telephone number for the callee (e.g., 1-666-777-8888) (block 52). The service may play the announcement to collect the speed dial digit(s) or callee's complete telephone number in a synthesized voice. After receiving the input from the subscriber 10, the service checks whether the subscriber has entered a speed dial digit/number (decision block 54) or the entire telephone number of the callee (decision block 56). If the subscriber enters neither the speed dial digit/number nor the callee's telephone number and if the timeout has occurred, the service may play a voice announcement (e.g., "Thanks for calling the intelligent call connection service from XYZ. Good Bye.") to the subscriber 10 and terminate the call (block 58). The subscriber may then need to call the service access number again to utilize the service. The timeout period here may be predetermined by the service provider or by the developer of the call connection service software. In an alternative embodiment, the service provider may offer one more chance to the caller prior to disconnecting the line. Here, the service may prompt the caller once again (block 52) and repeat the procedure given by blocks 54 and 56 prior to finally disconnecting the caller at block 58.

Once the call connection service receives an input from the caller 10 (e.g., a speed dial digit/number or the entire telephone number for the callee), the service takes over further call connection and processing. Initially, the service dials the callee's number (block 60) from the digits collected from the caller 10 and attempts to make a telephone connection. At block 62, the service determines if the callee's telephone line is busy or if there is no answer (i.e., no one, including an answering machine, picking up the phone at callee's telephone number). If the callee's telephone line is not busy or if someone (e.g., the callee or an answering machine or a voice message service) answers the phone, the service connects the subscriber 10 to the callee's telephone line (block 64). The subscriber may then converse with the callee (or someone at callee's place answering the phone) or leave a voice message for the callee.

However, if the service detects that the callee's line is busy or there is no answer, the service will play a voice message prompting the subscriber to press one of the three digits using the keypad (not shown) for the subscriber's phone (block 66). The voice prompt may ask the subscriber to press "1" to instruct the call connection service to keep trying the callee's number for a predetermined time period as discussed hereinbelow, or to press "2" to prepare the service to receive another telephone number or speed dial data (for the same or another called party) from the subscriber, or press "3" to instruct the service to record the subscriber's voice message for the callee and deliver it to the callee as discussed later hereinbelow. The subscriber may enter one of these choices using a DTMF (dual tone multi frequency) telephone keypad. In an alternative embodiment, a dialed pulse digit detection system or software may be installed in the AIN platform 14 as part of the connection service feature to support detection of rotary-dialed digits. Such a system thus allows a subscriber to operate a non-DTMF or rotary-dialed telephone to send requisite digits (e.g., speed dial digits or telephone number digits) to the connection service.

If the service detects the digit "1" at block 68, the service may continue further processing of the call as given under the reference block 70 (the letter "P") and described hereinbelow with reference to FIG. 2B. If the service detects the digit "2" at block 72, the service may repeat the steps identified in FIG. 2A by the blocks 52–66. Finally, if the service detects the digit "3" at block 74, the service may continue further processing of the subscriber's call as given under the reference block 76 (the letter "Q") and described hereinbelow with reference to FIG. 2B. However, it may happen that the subscriber may not enter any of the three digits or, alternatively, may enter a non-specified digit (e.g., the "#" sign or digit "7"). In the former situation, the connection service may wait for a predetermined time (as selected by the service provider or the developer of the service software) to receive an input from the subscriber. If the subscriber fails to input one of the digits ("1" "2", or "3") during the predetermined time, the service may play a voice message to the subscriber (e.g., "Thanks for using the call connection service from the XYZ company. Good Bye.") and then disconnect the telephone connection with the subscriber as represented by block 58 in FIG. 2A. In the latter situation, the service may play a pre-recorded voice message informing the subscriber that the digit entered by the subscriber is not recognized by the service and asking the subscriber to reenter the subscriber's choice.

FIG. 2B is a continuation of the flowchart depicted in FIG. 2A. After pressing "1", the subscriber 10 hangs up (block 80) and the service continues with further processing. If the subscriber presses "3", the service invites the subscriber 10 to record a voice message for the called party 12. The subscriber 10 then records the message for the callee 12 (block 82) and the service stores the subscriber's message for later delivery to the called party. After recording the voice message, the subscriber hangs up (block 80). According to the present invention, even if the subscriber hangs up, the connection service continues dialing the called party's telephone number at predetermined intervals (e.g., every 20 seconds for a busy line, or every two minutes for no answer) as depicted at block 84. The connection service keeps monitoring whether the called party (or any person picking up the called party's telephone) answers the phone (block 86) during a predetermined timeout period (e.g., 15 minutes or 30 minutes). If the timeout period has not elapsed (block 88), the connection service continues dialing the callee's number.

It is noted that the service parameters (e.g., duration of various timeout periods, number of redial attempts, time interval between two successive redials to callee's number, etc.) may be predetermined by the service provider. Alternatively, these service parameters may be flexibly set (e.g., on a per-call basis, or on a monthly basis) by the subscriber depending on the subscriber's needs. For example, the subscriber 10 may enter the numerical value for the duration of the timeout period (at blocks 88 and 122, for example) using the DTMF keypad for the subscriber's telephone. Alternatively, the subscriber 10 may access over the Internet a webpage maintained by the service provider to enter the subscriber's choice for various timeout periods, subscriber-specific information (e.g., billing address, entries for the Reach List, etc.), and any other data that the subscriber wishes to communicate to the service provider.

Referring again to FIG. 2B, once the timeout period (block 88) expires, the call connection service places a call to the subscriber 10 using the first phone number recorded in the subscriber-specific Reach List 42. If the subscriber cannot be reached at that phone number, the service may select the next phone number in the Reach List 42, and so on until all phone numbers are exhausted or when the subscriber answers the phone. Upon call connection, the service informs the subscriber of its inability to connect to the called party and plays pre-recorded voice prompts to the subscriber asking the subscriber to press "1" to further continue calling the called party 12 until a second timeout occurs, or to press "9" to quit calling the callee 12 (block 90). If the subscriber 10 enters the digit "9" on the telephone keypad (block 92), the connection service terminates the call connection attempt and also terminates the call with the subscriber with a good-bye message (e.g., "Thanks for calling the XYZ call connection service. Good Bye.") (block 94). In an alternative embodiment, after receiving digit "9" from the subscriber 10, the connection service may return to block 52 (FIG. 2A) and offer new dialing options to the subscriber. The subscriber may then select another callee or may simply hang up.

If the subscriber presses a "1" (block 96), the call connection service again takes over and the subscriber hangs up. Thereafter, the process is repeated starting with block 80 as shown in FIG. 2B. However, if the connection service neither receives a "9" nor a "1" from the subscriber within a predetermined time duration (e.g., 45 seconds), the service discontinues its calling attempts to the called party and terminates the call with the subscriber with a good-bye message as described in the previous paragraph. The discussion hereinbefore was related to the situation where there was no answer from the called party in response to repeated attempts by the call connection service to reach the callee (block 86). If, on the other hand, the callee (or someone else) answers a call from the service, the service first checks to see whether there is any voice message for the callee 12 from the subscriber 10 (block 98). If the subscriber earlier did not leave any voice message for the callee 12 (at block 82), the connection service continues further processing at the reference block 100 (FIGS. 2B and 2C) represented by the letter "R". On the other hand, if there is a voice message from the subscriber 10, the service plays the subscriber's voice message to the callee 12 (or to the person answering the called party's phone) over the callee's telephone line (block 102) and continues further processing at the reference block 104 (FIGS. 2B and 2C) represented by the letter "S".

FIG. 2C is a continuation of the flowchart depicted in FIG. 2B. In the absence of any voice message from the subscriber 10, the connection service asks the called party (or the person answering the callee's phone) to hold or remain on line after the called party answers one of the calls placed by the service (block 110). While the called party is on hold, the connection service dials the subscriber's phone number using the Reach List 42 (block 112). As noted hereinbefore, if the subscriber cannot be reached at the first telephone number in the Reach List 42, the connection service picks the second number in the Reach List 42 and dials that number. This process of selecting different access numbers continues until the subscriber's line is answered or until a timeout occurs. In one embodiment, if a predetermined time period (e.g., one minute) runs out without the subscriber's phone being answered, the service may discontinue calling the subscriber and inform the callee (who is on hold) of the failed attempt. The service may also allow the callee 12 an option to leave a voice message for the subscriber 10 as discussed hereinbelow with reference to block 114. The subscriber may instruct the service about the order in which the subscriber's phone numbers be selected from the Reach List 42 by providing the order of preference during initial account setup when the subscriber signs up for the connection service. In one embodiment, the subscriber may be allowed to alter the earlier-selected order of calling at any time using the DTMF keypad on the subscriber's phone or through the account management section on the webpage (if available) of the service provider.

If there is any voice message from the subscriber 10 to the called party 12, the connection service first plays that message (blocks 102, 104) and then asks (through voice prompts) the called party 12 to press "1" (on the telephone keypad) to connect to the subscriber 10, "2" to repeat the subscriber's voice message, "3" to send a voice message to the subscriber, or "4" to forward the caller's voice message to another telephone number (block 114). If the callee presses "1" (block 116), the service requests the callee 12 to hold or stay on the line while the service attempts to connect to the subscriber 10 as discussed hereinbefore with reference to blocks 110 and 112. If the called party presses "2" instead of "1" (block 118), the connection service replays the subscriber's voice message recorded therewith (block 120) and thereafter asks the called party 12 whether the called party 12 now wishes to contact the subscriber/caller 10 (block 114). In one embodiment, the connection service may continue offering the four service options (at block 114) to the callee 12 until a predetermined timeout duration (block 122). It is noted that the called party 12 may not choose any of the four options for a long period of time or may keep selecting the same option (e.g., may keep pressing "2" every time) repetitively. The service provider may select appropriate value for the timeout duration (e.g., one minute). Once the timeout occurs, the connection service may place a call to the subscriber 10 using the Reach List 42 as discussed hereinbefore with reference to block 112. If the called party 12 hangs up at any time prior to being connected with the caller 10, the service may still call the subscriber/caller 10 using the Reach List 42 and inform the caller of the called party's action.

If the called party 12 presses "3" (block 124), the connection service prompts the called party 12 to record a voice message for the subscriber 10. The service then receives and stores the callee's voice message until played back to the subscriber 10 (block 126). After leaving the voice message, the callee 12 may hang up. The service calls the subscriber using the Reach List 42 (block 112) and plays the callee's voice message when the subscriber answers. Finally, if the callee 12 presses "4" (block 128), the service prompts the callee 12 to specify a telephone number where the callee 12 wishes to forward the subscriber/caller's voice message. After the callee 12 enters the phone number, the service may forward the subscriber's voice message to that phone number—i.e., to a message recording system (e.g., an answering machine) associated with the phone number where the subscriber's message is to be forwarded. After or concurrently with the message forwarding and if the timeout has not occurred, the connection service may again offer the four processing options given at block 114 to the callee 12 who is already on line. Ultimately, the connection service will call the subscriber 10 (block 112) and connect the callee 12 with the subscriber 10 if the callee 12 is still on line or inform the subscriber of callee's action(s) if the callee is no more on line.

From the foregoing discussion, it is observed that the call connection service obviates the need for the subscriber 10 to repetitively monitor the availability of callee's telephone line or to remain present at one telephone location until the callee gets connected. The call connection service allows caller mobility when the callee does not answer the caller's phone on the first attempt or when the callee's telephone line is busy when the caller first dials the callee's number. The call connection service takes a subscriber's call and connects to a destination requiring only one calling attempt by the caller/subscriber. After the subscriber dials the callee's number, the connection service takes over and the subscriber need not wait on line for the callee to answer. A telecommunication service provider may offer the call connection service according to the present invention as a stand alone service with its own independent resource databases. If the service provider offers a Personal Number Service (PNS), then the call connection service may be offered as an add-on feature to the PNS. The connection service software may be added to the PNS software module(s) and may be configured to share one or more data resources (such as, for example, the Reach List 42) with the PNS software module(s). In one embodiment, the service provider may charge the subscribers fees to utilize the call connection service. The fees may be charged in a number of different ways including, for example, on a per-usage basis, as a monthly flat rate, as a one-time subscription charge for unlimited service usage during a predefined service period (e.g., six months, one year), etc.

Some modifications or enhancements may also be implemented as part of the call connection service. For example, as noted hereinbefore, the connection service software may be equipped with a dialed pulse digit detection feature to allow subscribers with rotary phones to use the service from their rotary phones, without requiring DTMF phones. In another application, an ASR (Automatic Speech Recognition) voice driver software may be added to the call connection service software to support a voice-activated calling feature. Here, a subscriber may simply speak the name of the callee (e.g., "Call Robin Hood") the subscriber wishes to call and, with the help of the ASR software, the service matches the spoken phrase with a corresponding entry in the Speed Dial list 46 and automatically places a call to the selected callee. In another application, a subscriber may be offered an IDT (Intelligent Dial Tone) service over a wireline network (e.g., the AIN plaform 14 and the PSTN 16). With the IDT feature, a subscriber automatically gets connected to the call connection service whenever the subscriber picks up the phone to dial the callee's number. Here, the subscriber need not dial any access number first to activate the call connection service. The IDT feature allows the connection service logic to recognize that the caller is a subscriber of the call connection service as soon as the caller lifts the phone handset. After picking up the phone handset and upon receiving the dial tone, the caller simply proceeds to enter the callee's number or speed dial reference without worrying about any special activation number for the connection service.

A scheduler application may be offered as part of the call connection service. The scheduler feature delays the subscriber's call attempts until a specified time. For example, if subscriber X wants to make a call to the callee Y at 10 p.m., the scheduler application allows the subscriber X to schedule the call placement at 10 p.m. either by calling the connection service number and setting up the future call or while the subscriber X is on phone with callee Y any time prior to the scheduled call. The connection service "remembers" the scheduled time and initiates a call to the callee Y at that time and, thereafter, calls the subscriber X (using the Reach List 42 for the subscriber X) with the callee Y on the line. Such a feature also allows the subscriber X to take the subscriber's mind away for the future call. The subscriber does not need to remember the future event and also does not need to be present at only one telephone location. The service not only initiates the call to the callee Y, but also tracks down the subscriber X using the corresponding Reach List 42.

The discussion hereinbefore described the call connection service that is primarily implemented over a wireline network. However, it is noted that a similar service may be easily designed for use in a wireless environment. The call connection service and other additional features may be implemented in a wireless intelligent network (WIN) in a manner analogous to that described hereinbefore with reference to the AIN platform 14 for a wireline network. For example, an IDT-type feature may be implemented in a WIN environment to enable a mobile phone operator to access the call connection service immediately after turning on the mobile phone. This relieves the mobile phone operator of the hassle of dialing one number (i.e., the access number for the connection service) to dial another number (i.e., the callee's number).

The foregoing describes a telecommunication service that takes caller mobility into account and allows the caller to connect to a destination on one attempt. The intelligent call connection service according to the present invention receives a call initiated by a caller/subscriber and dials the called party's number identified by the subscriber. If the called party's line is busy or unanswered, the connection service prompts the subscriber to hang up. Thereafter, the connection service continues calling the called party for a predetermined duration and, when the called party answers, calls the subscriber back at one or more of the telephone numbers supplied by the subscriber as part of the service subscription. Thus, the subscriber or caller mobility is not hampered when the called party's line is busy or unanswered. The service doesn't require the caller/subscriber to reinitiate the call when the called party's line is busy or unanswered. The call connection service takes a subscriber's call and connects to a destination requiring only one calling attempt by the caller/subscriber.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method for establishing a telephone connection between a caller and a callee, said method comprising:

receiving a first telephone call from said caller, wherein said first telephone call identifies a first telephone number for said callee;

placing a second telephone call to said callee at said first telephone number;

identifying whether one of the following conditions is present at a first telephone associated with said first telephone number:

said first telephone remains on-hook after receiving said second telephone call, and said first telephone has been off-hook prior to receiving said second telephone call;

prompting said caller to indicate whether said caller wishes to continue calling said first telephone number despite said one of the conditions;

allowing said caller to disconnect after indicating said caller's desire to continue calling said first telephone number at a time specified by the caller;

beginning at the specified time, placing one or more phone calls to said first telephone number until a predetermined time period runs out, wherein two consecutive phone calls from said one or more phone calls are spaced a predetermined interval apart;

requesting said callee to remain on line after said callee answers one of said one or more phone calls; and placing a third telephone call to said caller using a reach list to establish said telephone connection between said caller and said callee, wherein said reach list includes a plurality of caller-specific telephone numbers that provides options for contacting said caller at more than one telephone number.

2. The method of claim 1, wherein placing said third telephone call to said caller includes:
selecting one of said plurality of caller-specific telephone numbers in said reach list;
dialing said one of said plurality of caller-specific telephone numbers;
determining whether said caller is available at said one of said plurality of caller-specific telephone numbers; and
repeating said selecting and said dialing for each additional one of said plurality of caller-specific telephone numbers when said caller is unavailable at a previously-dialed caller-specific telephone number from said reach list.

3. The method of claim 2, wherein each of said plurality of caller-specific telephone numbers is selected in a predetermined order.

4. The method of claim 3, wherein said predetermined order is specified by said caller.

5. The method of claim 1, wherein receiving said first telephone call from said caller includes receiving a speed-dial number from said caller, wherein said speed-dial number identifies said first telephone number for said callee.

6. The method of claim 1, wherein receiving said first telephone call from said caller includes receiving digits from said caller constituting said first telephone number for said callee.

7. The method of claim 1, wherein receiving said first telephone call from said caller includes:
prompting said caller to enter one of the following using a second telephone:
a speed dial number corresponding to said first telephone number, and
said first telephone number for said callee; and
receiving one of the following entered by said caller using said second telephone:
said speed dial number, and
said first telephone number for said callee.

8. The method of claim 1, wherein prompting said caller to indicate whether said caller wishes to continue calling said first telephone number includes prompting said caller to leave a first voice message for said callee, and wherein allowing said caller to disconnect includes allowing said caller to disconnect after leaving said first voice message for said callee.

9. The method of claim 8, wherein requesting said callee to remain on line includes:
playing said first voice message for said callee; and
prompting the callee to indicate whether the callee wishes to remain online after playing said first voice message.

10. The method of claim 9, further comprising at least one of the following after playing said first voice message for said callee:
playing said first voice message again after receiving an indication therefor from said callee;
receiving a second voice message from said callee and sending said second voice message to said caller; and
forwarding said first voice message to a second telephone number specified by said callee.

11. The method of claim 1, further comprising allowing said caller to set a value for at least one of the following:
said predetermined time period; and
said predetermined interval.

12. The method of claim 11, wherein allowing said caller to set said value includes at least one of the following:
allowing said caller to send said value over the Internet;
allowing said caller to enter said value from a keypad on a second telephone; and
allowing said caller to orally transmit said value to be set.

13. The method of claim 1, further comprising charging a fee to said caller for establishing said telephone connection between said caller and said callee.

14. A telecommunication system, wherein a caller communicates with a callee via said telecommunication system, and wherein said telecommunication system is configured to perform the following:
receive a first telephone call from said caller, wherein said first telephone call identifies a telephone number for said callee;
place a second telephone call to said callee at said telephone number;
identify whether one of the following conditions is present at a first telephone associated with said callee's telephone number:
said second telephone call is unanswered at said first telephone, and
said first telephone has been off-hook prior to receiving said second telephone call;
prompt said caller to indicate whether said caller wishes to continue calling said callee's telephone number despite said one of the conditions;
allow said caller to disconnect after indicating said caller's desire to continue calling said callee's telephone number at a time specified by the caller;
beginning at the specified time, place one or more phone calls to said callee's telephone number until a predetermined time period runs out, wherein two consecutive phone calls from said one or more phone calls are spaced a predetermined interval apart;
request said callee to remain on line after said callee answers one of said one or more phone calls; and
place a third telephone call to said caller using a reach list to establish said telephone connection between said caller and said callee, wherein said reach list includes a plurality of caller-specific telephone numbers that provides options for contacting said caller at more than one telephone number.

15. The telecommunication system of claim 14, wherein said telecommunication system is configured to place said third telephone call to said caller by:
selecting one of said plurality of caller-specific telephone numbers in said reach list;
dialing said one of said plurality of caller-specific telephone numbers;
determining whether said caller is available at said one of said plurality of caller-specific telephone numbers; and
repeating said selecting and said dialing for each additional one of said plurality of caller-specific telephone numbers when said caller is unavailable at a previously-dialed caller-specific telephone number from said reach list.

16. The telecommunication system of claim 14, wherein said telecommunication system is configured to receive said first telephone call from said caller by:
prompting said caller to enter one of the following using a second telephone:

a speed dial number corresponding to said callee's telephone number, and a plurality of digits constituting said telephone number for said callee; and receiving one of the following entered by said caller using said second telephone:

said speed dial number, and said plurality of digits.

17. The telecommunication system of claim 14, wherein the telecommunication system is further configured to allow said caller to set a value for at least one of the following:

said predetermined time period; and said predetermined interval.

18. The telecommunication system of claim 17, wherein said telecommunication system is configured to allow said caller to set said value in at least one of the following ways:

by sending said value over the Internet;

by entering said value from a keypad on a second telephone; and by orally transmitting said value to said telecommunication system.

19. A data storage medium operable in a telecommunication system, wherein a caller communicates with a callee via said telecommunication system, and wherein said data storage medium contains program instructions, which, when executed by said telecommunication system, configure said telecommunication system to perform the following:

receive a first telephone call from said caller, wherein said first telephone call identifies a first telephone number for said callee;

beginning at the specified time, place a second telephone call to said callee at said first telephone number;

identify whether one of the following conditions is present at a first telephone associated with said first telephone number:

said second telephone call is unanswered at said first telephone, and said first telephone has been off-hook prior to receiving said second telephone call;

prompt said caller to indicate whether said caller wishes to continue calling said first telephone number despite said one of the conditions;

allow said caller to disconnect after indicating said caller's desire to continue calling said first telephone number at a time specified by the caller;

place one or more phone calls to said first telephone number until a predetermined time period runs out, wherein two consecutive phone calls from said one or more phone calls are spaced a predetermined interval apart;

request said callee to remain on line after said callee answers one of said one or more phone calls; and place a third telephone call to said caller using a reach list to establish said telephone connection between said caller and said callee, wherein said reach list includes a plurality of caller-specific telephone numbers that provides options for contacting said caller at more than one telephone number.

20. The data storage medium of claim 19, wherein said program instructions, upon execution, further configure said telecommunication system to perform at least one of the following:

receive a first voice message from said caller and convey said first voice message to said callee;

receive a second voice message from said callee and send said second voice message to said caller; and forward said first voice message to a second telephone number specified by said callee.

* * * * *